United States Patent [19]

Yabune et al.

[11] 4,269,972
[45] May 26, 1981

[54] PROCESS FOR PRODUCING CELLULOSE DIACETATE HAVING IMPROVED RESISTANCE TO DELUSTERING PHENOMENON IN HOT WATER

[75] Inventors: Hideo Yabune; Yoshiyuki Ikemoto, both of Himeji, Japan

[73] Assignee: Daicel Ltd., Sakai, Japan

[21] Appl. No.: 47,469

[22] Filed: Jun. 11, 1979

[30] Foreign Application Priority Data

Jun. 9, 1978 [JP] Japan .................. 53-70278

[51] Int. Cl.³ .............................. C08B 3/06
[52] U.S. Cl. ......................... 536/71; 536/69; 536/76; 536/80
[58] Field of Search ............ 536/71, 69, 76, 80

[56] References Cited

U.S. PATENT DOCUMENTS

| | | | |
|---|---|---|---|
| 2,095,326 | 10/1937 | Haney | 536/76 |
| 2,432,153 | 12/1947 | Haney et al. | 536/76 |
| 2,432,341 | 12/1947 | Seymour et al. | 536/81 |
| 2,523,384 | 9/1950 | Martin et al. | 536/76 |
| 2,607,771 | 8/1952 | Groombridge et al. | 536/72 |
| 2,772,266 | 11/1956 | Malm et al. | 536/76 |
| 2,775,584 | 12/1956 | White et al. | 536/76 |
| 3,485,816 | 12/1969 | Crane et al. | 536/64 |
| 3,505,313 | 4/1970 | Kato | 536/76 |
| 3,595,854 | 7/1971 | Matsuzaki | 536/76 |
| 3,767,642 | 10/1973 | Campbell et al. | 536/69 |

FOREIGN PATENT DOCUMENTS 638316 6/1950 United Kingdom ............ 536/71

Primary Examiner—Ronald W. Griffin
Attorney, Agent, or Firm—Sughrue, Rothwell, Mion, Zinn and Macpeak

[57] ABSTRACT

Cellulose diacetate having improved resistance to delustering in hot water is produced by acetylation cellulose in the presence of a catalyst and then hydrolyzing (or ripening) the product to form secondary cellulose acetate; wherein the catalyst in the acetylated mixture is completely neutralized before about the middle of the hydrolysis reaction at the latest and thereafter hydrolysis is carried out at a temperature of about 110° to 120° C. while maintaining the concentration of acetic acid in the reaction mixture at about 67 to 78% by weight based on the total weight of the acetic acid and water, the relation between the hydrolysis temperature and the concentration of acetic acid being defined by the area between and including points A, B, C and D in FIG. 2.

6 Claims, 2 Drawing Figures

PROCESS FOR PRODUCING CELLULOSE DIACETATE HAVING IMPROVED RESISTANCE TO DELUSTERING PHENOMENON IN HOT WATER

BACKGROUND OF THE INVENTION

1. Field of the Invention

This invention relates to a process for producing cellulose diacetate having improved properties. More specifically, this invention relates to a process for producing cellulose diacetate having reduced delustering tendency in hot water.

The cellulose diacetate in this invention denotes cellulose diacetate having a combined acetic acid amount of 54 to 57%.

2. Description of the Prior Art

When subjected to treatment with hot water, heated steam or the like in a dyeing process or the like, fibers from cellulose diacetate generally lose their characteristic luster and clarity and whiten. This phenomenon is referred to as the "delustering phenomenon".

The delustering phenomenon impairs not only the surface characteristics, such as gloss luster and dyeability, of cellulose acetate fibers, but also their physical characteristics (e.g., elongation and tenacity), and consequently reduces the merchandise value of the product. In particular, when synthetic fibers having higher thermal stability such as polyester fibers are used as blend-woven or blend-knitted fabrics with cellulose diacetate, it is frequently necessary to perform the hot water treatment, heated steam treatment, etc., of these fabrics at temperatures as high as about 120° C. in the dyeing process. Accordingly, the delustering phenomenon of cellulose diacetate is an especially important problem in this technical field.

In the production of cellulose diacetate generally used in the art, the first step is to pre-treat cellulosic raw material such as wood pulp or cotton linters with a suitable amount of acetic acid and place the pre-treated material in a cooled acetylating mixture consisting of acetic acid, acetic anhydride and a catalyst to form primary cellulose acetate (completely esterified cellulose). The amount of acetic anhydride is in excess of the amount stoichiometrically required for reaction with the cellulose, the water in the cellulose, and the traces of water in the acetic acid, acetic anhydride and catalyst. Sulfuric acid is frequently used as a catalyst for commercial operations.

In the next step, an aqueous solution of a neutralizing agent (such as a carbonate, hydroxide, oxide or acetate of calcium, magnesium, iron, aluminum or zinc, preferably magnesium acetate) is added to the primary cellulose acetate to hydrolyze the acetic anhydride remaining after acetylation and to neutralize part of the catalyst used in the esterification. The resulting primary cellulose acetate is then hydrolyzed by maintaining it at 50° to 90° C. while a small amount of the acetylation catalyst (e.g., sulfuric acid) still remains, to thereby transform it to secondary cellulose acetate having a prescribed degree of acetylation and a prescribed degree of polymerization.

When secondary cellulose acetate having the prescribed degrees of acetylation and polymerization is obtained, the catalyst remaining in the ripened solution is completely neutralized with a neutralizing agent of the types exemplified above. Occasionally this neutralization is not performed. The hydrolyzed (ripened) solution is then poured into water or dilute acetic acid (or water or dilute acetic acid is poured into the hydrolyzed (ripened) solution) to separate the secondary cellulose acetate, which is washed and stabilized to obtain the final product. The time required for hydrolysis by this method, although it varies somewhat depending upon the composition and the temperature of the ripening bath, etc., is from several hours to 10 plus several hours which is comparatively long. Films from the cellulose acetate so obtained generally whiten and deluster when brought into contact with hot water at 80° to 90° C.

Several attempts have been made at reducing the delustering tendency of cellulose diacetate in hot water in the past. Attempts have been made to improve the cellulose diacetate produced by conventional method by an after-treatment. These after-treatments include (1) balancing acidic residue in the cellulose diacetate with an equivalent of a metal ion in a purifying step to increase the stability of the cellulose diacetate (Japanese Patent Publication No. 37203/72); (2) adding various metal salts in a washing step after-treatment (Japanese Patent Publication No. 10609/74); (3) adding a minute amount of an organic acid or its ester to a spinning dope containing cellulose diacetate (e.g., Japanese Patent Publication Nos. 3228/70, 11761/73 and 11762/73); (4) adding a minute amount of a nitrogen-containing organic compound to a spinning dope containing cellulose diacetate (Japanese Patent Application (OPI) No. 30753/73 (the term "OPI" as used herein refers to a "published unexamined Japanese patent application") and Japanese Patent Publication No. 10610/74); (5) removing a low degree of acetylation portion and a low degree of polymerization portion from the cellulose diacetate flakes by extraction (Japanese Patent Publication Nos. 23543/73 and 6229/75); and (6) treating acetate fibers with superheated steam (Japanese Patent Publication No. 3271/69). However, these methods do not offer a complete solution to the problem of reducing the delustering phenomenon because they complicate the process or their effects have poor reproducibility.

On the other hand, aside from the purpose of reducing delustering in hot water, it has been suggested to produce cellulose diacetate continuously in which the hydrolysis reaction is performed at relatively high temperatures to shorten the hydrolysis time. For example, Japanese Patent Application (OPI) No. 17580/73 discloses a process for continuously producing secondary cellulose esters from completely esterified cellulose starting material, characterized in that a completely esterified cellulose solution with the strongly acidic catalyst having been completely neutralized is maintained at a temperature of from about 125° C. to 170° C., and the completely esterified cellulose is hydrolyzed. The Publication states that this process leads to the improvement of the quality of acetate flakes such as the viscosity ratio, clarity, and filterability.

Japanese Patent Application (OPI) No. 17583/73 discloses that flakes having superior filterability and uniform quality can be obtained by mixing a neutralizing agent for a strong acidic catalyst, such as magnesium acetate solution, with the reaction solution at a time when completely esterified cellulose is formed, thereby to reduce the amount of the catalyst to 1.5 to 4 wt% based on the cellulose, and hydrolyzing the cellulose at 90° to 120° C. for 30 to 60 minutes.

British Pat. No. 620,726 discloses that cellulose diacetate having superior stability is obtained by adding a neutralizing agent in a nearly equivalent amount (the "nearly equivalent amount" is defined as the remaining of about 0.15% of the acid catalyst) based on the strongly acidic catalyst used for esterification of the reaction solution at a time when the completely esterified cellulose is formed, and hydrolyzing the esterified cellulose at a temperature of at least 125° C.

It has now been found that the secondary cellulose acetate obtained by using these high-temperature hydrolysis methods is superior in its resistance to delustering in hot water in comparison to the cellulose acetate obtained by conventional methods in which hydrolysis is carried out at relatively low temperatures. The former product, however, is highly colored.

SUMMARY OF THE INVENTION

Accordingly, a principal object of the present invention is to reduce the delustering tendency of cellulose diacetate without coloration.

It has now been found that cellulose diacetate capable of providing acetate fibers having reduced coloration and superior resistance to delustering in hot water can be obtained by modifying the conventional process such that when the hydrolysis temperature is adjusted to 110° to 120° C., the bath concentration in weight percent of acetic acid based on the total amount of acetic acid and water in the reaction system is adjusted to not more than 75% by weight at a reaction temperature of 120° C. and to not more than 78% by weight at a reaction temperature of 110° C.; and, before high temperature hydrolysis, the catalyst is completely neutralized at the end of the acetylation reaction or when increasing the temperature to the prescribed hydrolysis temperature (desirably, when the neutralization temperatures reaches 60° to 75° C.).

According to this invention, there is provided a process for producing cellulose diacetate having improved resistance to delustering in hot water, which comprises acetylating cellulose in the presence of an acetylation catalyst and hydrolyzing the product to form secondary cellulose acetate, wherein at the latest in about the middle stage of the hydrolysis reaction and thereafter the hydrolysis is carried out in a system in which the acetylation catalyst is completely neutralized, while prescribing the temperature and bath concentration (the term "bath concentration" or "acetic acid concentration" as used herein is the concentration of acetic acid in weight percent based on the total amount of acetic acid and water in the bath) of the system within the area defined by the area between and including the points A (110, 78), B (110, 71), C (120, 67) and D (120, 75), in rectangular coordinates (°C., % by weight) shown in FIG. 2 of the accompanying drawings.

DETAILED DESCRIPTION OF THE INVENTION

Figure 2:
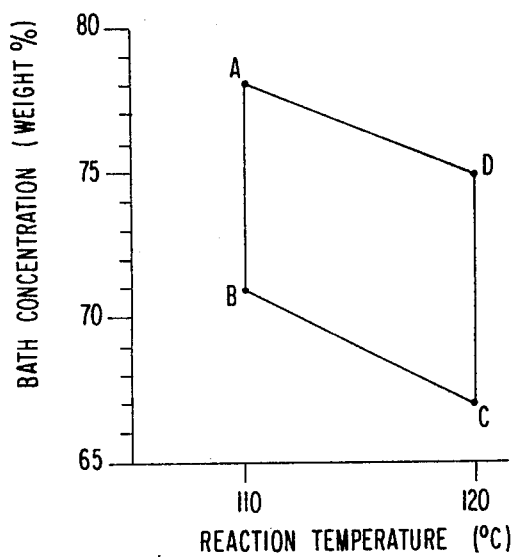
FIG. 2 is a graphic representation showing the concentration and temperature of the bath at the time of hydrolysis reaction in the production of cellulose diacetate by the process of this invention.

The high temperature hydrolysis of this invention is characterized by the fact that it is carried out after completely neutralizing the strong acidic catalyst subsequent to the formation of primary cellulose acetate (completely esterified cellulose); or at an early stage in the hydrolysis reaction, the strong acidic catalyst is partially neutralized, the temperature is raised to 60° to 75° C. and the catalyst is substantially completely neutralized (to ensure complete neutralization of the catalyst, the neutralizing agent is used in a slight excess of the stoichiometric amount, e.g., the amount of the neutralizing agent exceeds the stoichiometric amount by 2%). Then after adjusting the bath concentration of the system to about 67 to 78% by weight and rapidly heating the reaction system to 110° to 120° C. in a closed condition as defined by the area in FIG. 2, the hydrolysis is completed. The effect of preventing delustering phenomenon in hot water can be increased at the higher hydrolysis temperatures within the above-specified range. However, when it exceeds 120° C., cellulose diacetate is likely to be colored. At reaction temperatures lower than 110° C., a sufficient delustering preventing effect cannot be expected.

Suitable cellulosic materials which can be acetylated in accordance with the present invention include wood pulp and cotton linter.

It has been found that not only the hydrolysis temperature but also the composition of the reaction bath during hydrolysis affects the coloration of cellulose diacetate. For example, when cellulose acetate flakes having a combined acetic acid content of 55% are obtained by using the high temperature hydrolysis reaction, the effects of hydrolysis temperature and the bath concentration on the degree of yellowness of the cellulose acetate flakes (the increase Δ YI (Yellowness Index) in the degree of yellowness from before the hydrolysis) are as shown in FIG. 1.

The "degree of yellowness" as referred to herein denotes yellowness index determined by a Hunter colorimeter for a solution of the cellulose acetate flakes in methylene chloride-methanol (9:1 by weight) having a solids concentration of 12% by weight.

Figure 1:
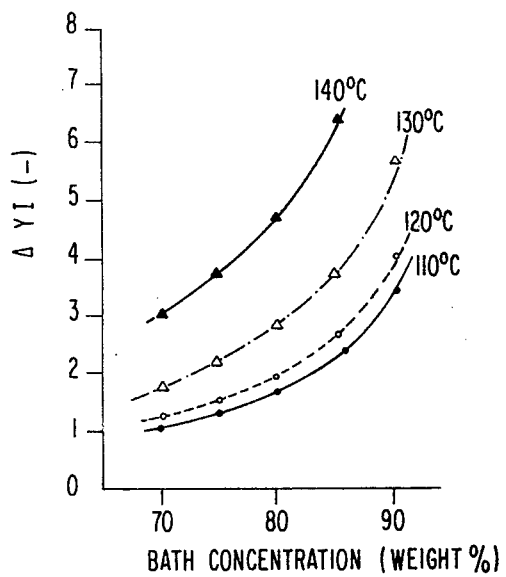
FIG. 1 is a graphic representation showing the effects of temperature and bath concentration in a high temperature hydrolysis reaction on the degree of coloration of cellulose diacetate.

When the increase (Δ YI) in yellowness index in FIG. 1 is less than 1.5, products substantially free from coloration can be obtained. The hydrolysis reaction conditions which satisfy Δ YI<1.5 are determined by the temperature and the upper limit of the bath concentration tabulated below.

| Hydrolysis Conditions for Δ YI < 1.5 | | | |
| --- | --- | --- | --- |
| Temperature Applied (°C.) | 110 | 120 | 130 |
| Upper Limit of the Bath Concentration (wt %) | 78 | 75 | 67 |

It is seen that the bath concentration must be decreased as the hydrolysis temperature increases.

On the other hand, because primary cellulose acetate (completely esterified cellulose) in the early hydrolysis stage has poor compatibility with water, decreasing the bath concentration tends to cause gellation of the reaction system and result in products having poor solubility and filterability. The lower limit on the bath concentration at which hydrolysis can be performed without gelation is 7 to 8% by weight lower than the upper limits on the bath concentration as determined to avoid coloration.

Immediately after the lapse of the reaction time set for the hydrolysis reaction, the reaction solution is rapidly cooled by indirect cooling by a jacket or by a so-called flash method. The secondary cellulose acetate as the desired product is obtained in a conventional manner.

The cellulose diacetate obtained by the process of this invention has a much lower yellowness index than that obtained by the conventional high temperature hydrolysis methods, and exhibits much the same whiteness as cellulose diacetate flakes obtained by a method in which a sulfuric acid catalyst is used, and hydrolysis is performed at atmospheric pressure. Furthermore, as is seen from the Examples below, a film cast from the resulting cellulose diacetate exhibits much less delustering in hot water than a film of cellulose acetate obtained by ordinary hydrolysis method and scarcely shows any appreciable delustering phenomenon even after having been maintained in hot water at 120° C. for 2 hours.

As secondary effects, the cellulose diacetate obtained by the process of this invention has a low content of residual sulfuric acid group. It has good solubility in solvents such as acetone and high clarity, and when dissolved in these solvents forms a solution having a low turbidity, good filterability and low false-viscosity.

The following Examples illustrate the present invention, however, they should not be construed as limiting the invention.

The delustering index (DI) by a film method is measured by the following procedure.

Cellulose diacetate flakes in an absolutely dry condition are dissolved in a mixture of acetone and methanol (95.5:4.5 by weight) so that the solids content reaches 22% by weight. After dissolution, the resulting dope is filtered through two cotton cloths at a filtration pressure of 2 kg/cm² and allowed to stand and defoam. The dope is then cast on a glass plate into a film having a thickness of 0.05±0.005 mm in an atmosphere having a relative humidity of not more than 30%. After standing for about 15 minutes, the cast film is stripped from the glass plate. A sample 2 cm in width and 12 cm in length is cut from the film, attached to a fixed frame, dried at 80°±1° C. for 1 hour and then seasoned at room temperature for 16 hours.

The cast film sample is subjected to a hot water delustering test at 98° C. as follows: The sample film on the fixed frame is dipped in hot water at 98°±0.2° C. containing 1% of a surface active agent ("LIPOLAN TE", a trade name for a product of Lion Oils and Fats Co. Ltd.) for 2 hours. After dipping, the film sample is washed with deionized water for 15 minutes, dried at 80° C. for 15 minutes, and cut off from the fixed frame. The transmittance of the film at 400 mμ is measured, and the film thickness is corrected in accordance with equation (1).

$$\log T_{0.05} = 2 - \frac{0.05}{b} \times \log \frac{100}{T_b} \quad (1)$$

wherein b is the thickness (mm) of the film, and $T_b$ is the transmittance of the film having a thickness of b mm at 400 mμ.

The hot water delustering index (DI, %) is calculated on the basis of equation (2).

$$DI(\%) = \frac{T_{0.05}(\text{before}) - T_{0.05}(\text{after})}{T_{0.05}(\text{before})} \times 100$$

wherein $T_{0.05}$(before) represents the transmittance at a wavelength of 400 mμ of the film (thickness 0.05 mm) before the test, and $T_{0.05}$(after) represents the transmittance at a wavelength of 400 mμ of the film (thickness 0.05 mm) after the test.

The hot water delustering test at 120° C. is the same as that performed at 98° C. described above except that the sample is dipped in hot water at 120° C. containing no surface active agent for 2 hours.

In the following Examples, all parts are by weight.

EXAMPLE 1

Wood pulp having an α-cellulose content of about 97% by weight was disintegrated and 100 parts of glacial acetic acid was uniformly sprayed onto 100 parts of the disintegrated pulp. The mixture was stirred at room temperature for 90 minutes. The mixture was put into a cooled mixture consisting of 280 parts of acetic anhydride and 15 parts of sulfuric acid and they were mixed to acetylate the cellulose. After the acetylation was over, 22.3 parts of a 30% aqueous solution of sodium acetate was added to decompose the remaining excess of the acetic anhydride and stop the acetylation reaction. The amount of the sulfuric acid catalyst in the system at this time was 7.0 parts as a theoretical amount. The reaction mixture was heated to 70° C. over the period of about 20 minutes, and 63.0 parts of a 30% by weight aqueous solution of sodium acetate (in excess by an amount corresponding to 0.3 part of sulfuric acid over the amount of sulfuric acid to be neutralized) was added to neutralize the sulfuric acid catalyst completely. Water was slowly added over the period of 10 minutes so that the bath concentration in the system (the weight percent of acetic acid based on the total amount of the acetic acid and water) reached 70% by weight, and the mixture was heated to 120° C. over a period of 50 minutes in a closed condition. The mixture was hydrolyzed at 120° C. for 80 minutes and then rapidly cooled to below 90° C. to stop the reaction. The resulting secondary cellulose acetate was then separated by an ordinary method, boiled in a dilute aqueous solution of acetic acid for 2 hours under atmospheric pressure, washed with deionized water, dehydrated and dried to form cellulose diacetate flakes. The resulting cellulose diacetate flakes had a hot water delustering index (DI) as determined by a film method of 6.8% at 98° C. and 37.3% at 120° C.

EXAMPLE 2

Wood pulp having an α-cellulose content of about 97% by weight was disintegrated, and 35 parts of glacial acetic acid was uniformly sprayed onto 100 parts of the disintegrated pulp. The mixture was stirred at room temperature for 120 minutes. The mixture was put into a cooled mixture consisting of 245 parts of acetic anhydride, 365 parts of acetic acid and 15 parts of sulfuric acid, and they were mixed with stirring to acetylate the cellulose at below 45° C. After the acetylation, 74.1 parts of a 30% by weight aqueous solution of magnesium acetate was added to decompose the remaining excess of acetic anhydride and to neutralize the sulfuric acid completely and thus to stop the esterification reaction (the magnesium acetate solution containing magnesium acetate was added in excess in an amount corresponding to 0.3 part of sulfuric acid over the amount of sulfuric acid to be neutralized). Water was added slowly over the period of 20 minutes so that the bath concentration in the system reached 75% by weight and the system was placed in a closed condition. The temperature was raised to 120° C. over a period of 70 minutes and the mixture was hydrolyzed at 120° C. for 65 minutes. The reaction mixture was rapidly cooled to below 90° C. by exterior cooling, etc., to stop the reaction. The cellulose diacetate was separated and purified in the same way as in Example 1. The resulting cellulose diacetate flakes had a hot water delustering index (DI) by a film method of 4.2% at 98° C. and 17.4% at 120° C.

EXAMPLE 3

In the same way as in Example 2, glacial acetic acid was uniformly sprayed onto disintegrated wood pulp and the mixture was stirred for 120 minutes at room temperature. The mixture was put into a cooled mixture consisting of 350 parts of acetic anhydride, 60 parts of acetic acid and 15 parts of sulfuric acid and they were mixed with stirring. The reaction temperature was gradually increased from about 0° C. to about 50° C. and the cellulose was acetylated for 50 minutes. A 20% by weight aqueous solution of magnesium acetate containing magnesium acetate in excess of the amount stoichiometrically required to neutralize sulfuric acid in the reaction system was added to the dope after acetylation. Then, water was added over the period of 30 minutes, and the reaction system was maintained in the closed state. The reaction mixture was heated from about 50° C. over a period of 80 minutes to 120° C. and maintained at 120° C. for 50 minutes to saponify and hydrolyze it. Then, the reaction mixture was rapidly cooled to below 90° C. to stop the reaction. The reaction mixture was worked up in the same way as in Example 2. The resulting cellulose diacetate had a hot water delustering index (DI) of 4.2% at 98° C. and 6.0% at 120° C.

COMPARATIVE EXAMPLE

A completely acetylated dope was obtained by performing the same acetylation reaction as in Example 2. Then, 43.6 parts of a 30% by weight aqueous solution of magnesium acetate was added to hydrolyze the excess of acetic anhydride and neutralize a part of the sulfuric acid. The theoretical amount of the sulfuric acid catalyst remaining in the reaction system was 6 parts. The acetylation reaction was thus stopped. Then, while the reaction mixture was heated to about 60° C. over the period of 30 minutes, 14.6 parts of a 30% by weight aqueous solution of magnesium acetate was added. The theoretical amount of the remaining sulfuric acid at this time was 3 parts. Then, water was added to adjust the bath concentration in the system to about 85% by weight, and the temperature was raised further to maintain it stably at 75° C. Then, the reaction mixture was ripened until the amount of combined acetic acid of secondary cellulose acetate reached 55%. After the reaction, 16.0 parts of a 30% by weight aqueous solution of magnesium acetate (containing an excessive amount corresponding to 0.3 part over the stoichiometrical amount required to neutralize sulfuric acid) was added to neutralize the sulfuric acid completely and to stop the reaction. The reaction mixture was worked up in the same way as in Example 1 to afford cellulose diacetate flakes. The resulting cellulose diacetate flakes had a hot water delustering index (DI) by a film method of 17.0% at 98° C. and 63.2% at 120° C.

Table 1 summarizes the DI values obtained in the above Examples.

TABLE 1

Comparison of the degree of delustering in hot water by a film method

| | Hot Water Delustering Index (DI %) | |
|---|---|---|
| | 98° C. × 2 Hours | 120° C. × 2 Hours |
| Example 1 | 6.8 | 37.3 |
| Example 2 | 4.2 | 17.4 |
| Example 3 | 4.2 | 6.0 |
| Comparative Example | 17.0 | 63.2 |

While the invention has been described in detail and with reference to specific embodiments thereof, it will be apparent to one skilled in the art that various changes and modifications can be made therein without departing from the spirit and scope thereof.

What is claimed is:

1. A process for producing cellulose diacetate having reduced delustering tendency in hot water which comprises acetylating cellulose in the presence of an acetylation catalyst and hydrolyzing the product to form secondary cellulose acetate, with the process further comprising completely neutralizing the acetylation catalyst before at least the middle stage of the hydrolysis reaction while maintaining the temperature and concentration of the bath within the area defined by and including the points A (110, 78), B (110, 71), C (120, 67), and D (120, 75), in rectangular coordinates (degree C., % by weight) shown in FIG. 2 in the accompanying drawings.

2. The process of claim 1, wherein said catalyst is completely neutralized before said hydrolyzing step.

3. The process of claim 1, wherein said catalyst is completely neutralized after the initiation of said hydrolyzing step but before the middle stage of said hydrolysis reaction.

4. The process of claim 1, wherein after neutralizing said catalyst, water is added to the hydrolysis bath to adjust the bath concentration to the area defined by said points A, B, C and D in FIG. 2.

5. The process of claim 1, wherein said catalyst is neutralized at about 60° to 75° C.

6. A process for producing cellulose diacetate having reduced delustering tendency in hot water which comprises acetylating cellulose in the presence of an acetylation catalyst, neutralizing the acetylation catalyst, adding water to the acetylation bath to adjust the bath concentration within the area defined by the points A (110, 78), B (110, 71), C (120, 67), and D (120, 75) in rectangular coordinates (degree C., % by weight) in FIG. 2, and hydrolyzing the product to form secondary cellulose acetate.

* * * * *